(12) United States Patent
Cappadona et al.

(10) Patent No.: US 10,662,076 B2
(45) Date of Patent: *May 26, 2020

(54) CARTRIDGE-BASED WATER FILTER

(71) Applicant: CARICO INTERNATIONAL, INC., Fort Lauderdale, FL (US)

(72) Inventors: Richard R. Cappadona, Boca Raton, FL (US); Ronald David Webb, Brooklyn, MI (US)

(73) Assignee: CARICO INTERNATIONAL, INC., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/385,036

(22) Filed: Apr. 16, 2019

(65) Prior Publication Data

US 2019/0241442 A1    Aug. 8, 2019

Related U.S. Application Data

(63) Continuation of application No. 15/004,026, filed on Jan. 22, 2016, now Pat. No. 10,273,164.

(51) Int. Cl.
*C02F 1/00* (2006.01)
*C02F 1/28* (2006.01)
*B01D 29/58* (2006.01)

(52) U.S. Cl.
CPC .............. *C02F 1/001* (2013.01); *C02F 1/283* (2013.01); *B01D 29/58* (2013.01); *B01D 2201/4038* (2013.01); *C02F 2201/006* (2013.01)

(58) Field of Classification Search
CPC .................. C02F 1/001; C02F 1/283
See application file for complete search history.

(56) References Cited

U.S. PATENT DOCUMENTS

| | | |
|---|---|---|
| 5,112,503 A | 5/1992 | Raifman |
| 5,273,649 A | 12/1993 | Magnusson et al. |
| 8,486,265 B2 | 7/2013 | Lin |
| 2009/0008318 A1 | 1/2009 | Anes et al. |
| 2012/0144855 A1 | 6/2012 | Krause et al. |

*Primary Examiner* — Krishnan S Menon
*Assistant Examiner* — Waqaas Ali
(74) *Attorney, Agent, or Firm* — Jones Day

(57) ABSTRACT

A fluid-filtering apparatus includes an upper cartridge and a lower cartridge. The upper cartridge includes a fluid-filtering first tube that surrounds and extends along an axis and that defines a first-tube cavity. An axially-extending fluid-filtering second tube is located within the first-tube cavity and defines a second-tube cavity. The lower cartridge includes an axially-extending third tube that defines a third cavity. An axially-extending fluid-filtering fourth tube, of the lower cartridge, is located within the third cavity and defines a fourth-tube cavity. The upper and lower cartridges are coupled together and contained within a casing.

20 Claims, 11 Drawing Sheets

CARTRIDGE-BASED WATER FILTER

CROSS-REFERENCE TO RELATED APPLICATION

This is a continuation of U.S. patent application Ser. No. 15/004,026, filed on Jan. 22, 2016, the entirety of which is incorporated herein by reference.

TECHNICAL FIELD

This relates to cartridge-based water filters.

BACKGROUND

A water filter is used to filter water. The filter may include a series of filter cartridges through which the water flows. Each cartridge in the series filters out contaminants from the water flowing through it.

SUMMARY

In one aspect, a fluid-filtering apparatus includes an upper cartridge including a first tube of a first fluid-filtering material, that surrounds and extends along an axis and that defines a first-tube cavity extending from a closed top to a first-tube bottom opening; an axially-extending second tube of a second fluid-filtering material, that is located within the first-tube cavity and that defines a second-tube cavity extending from a closed top to a second-tube bottom opening; and an upper-cartridge bottom cap that extends across, and seals, the first-tube bottom opening; a lower cartridge including an axially-extending third tube, that defines a third-tube cavity with a third-tube top opening that communicates with the second-tube bottom opening; an axially-extending fourth tube comprising a fourth fluid-filtering material, that is located within the third-tube cavity and that defines a fourth-tube cavity that extends from a closed top end to a fourth-tube bottom opening; and a lower-cartridge bottom cap that extends across, and seals, the second-tube bottom opening; and a casing including an inlet channel configured to channel fluid into the fluid-filtering apparatus, an outlet channel configured for fluid communication with the fourth-tube bottom opening.

Fluid flowing through the fluid-filtering apparatus may be configured to flow in an order of (i) into the casing through the inlet channel, (ii) through and into the first tube, (iii) through and into the second tube, (iv) downward through the second-tube bottom opening and into the third-tube top opening, (v) through and into the fourth tube, (vi) through the fourth-tube bottom opening, and (vii) out through the casing's outlet channel.

In another aspect, a method includes filtering water using the fluid-filtering apparatus.

DETAILED DESCRIPTION

Figure 1:
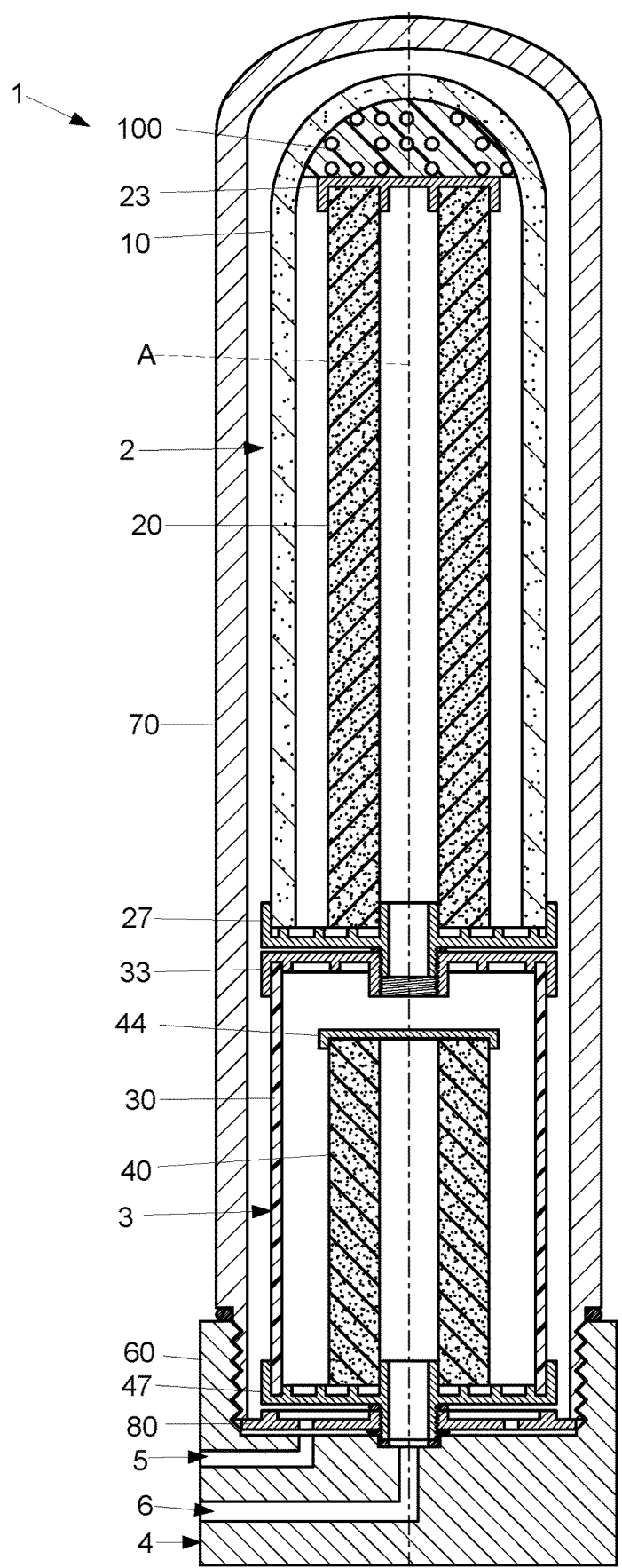
FIG. 1 is a sectional view of an example filtering apparatus, shown in an assembled configuration.
Figure 2:
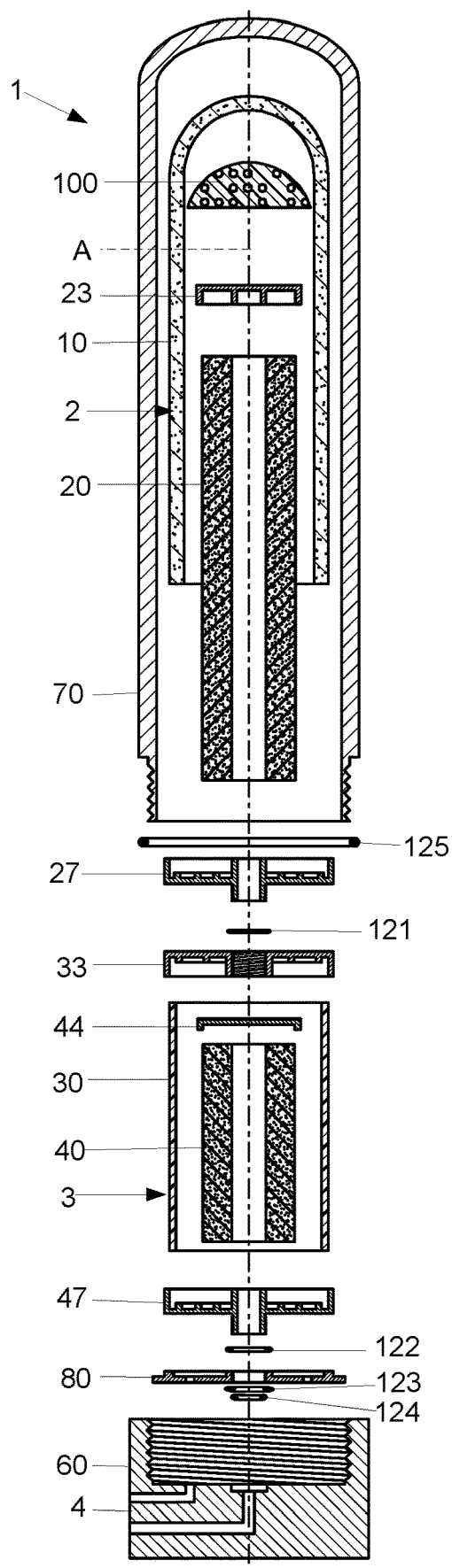
FIG. 2 is an exploded (unassembled) view of the apparatus.
Figure 3:
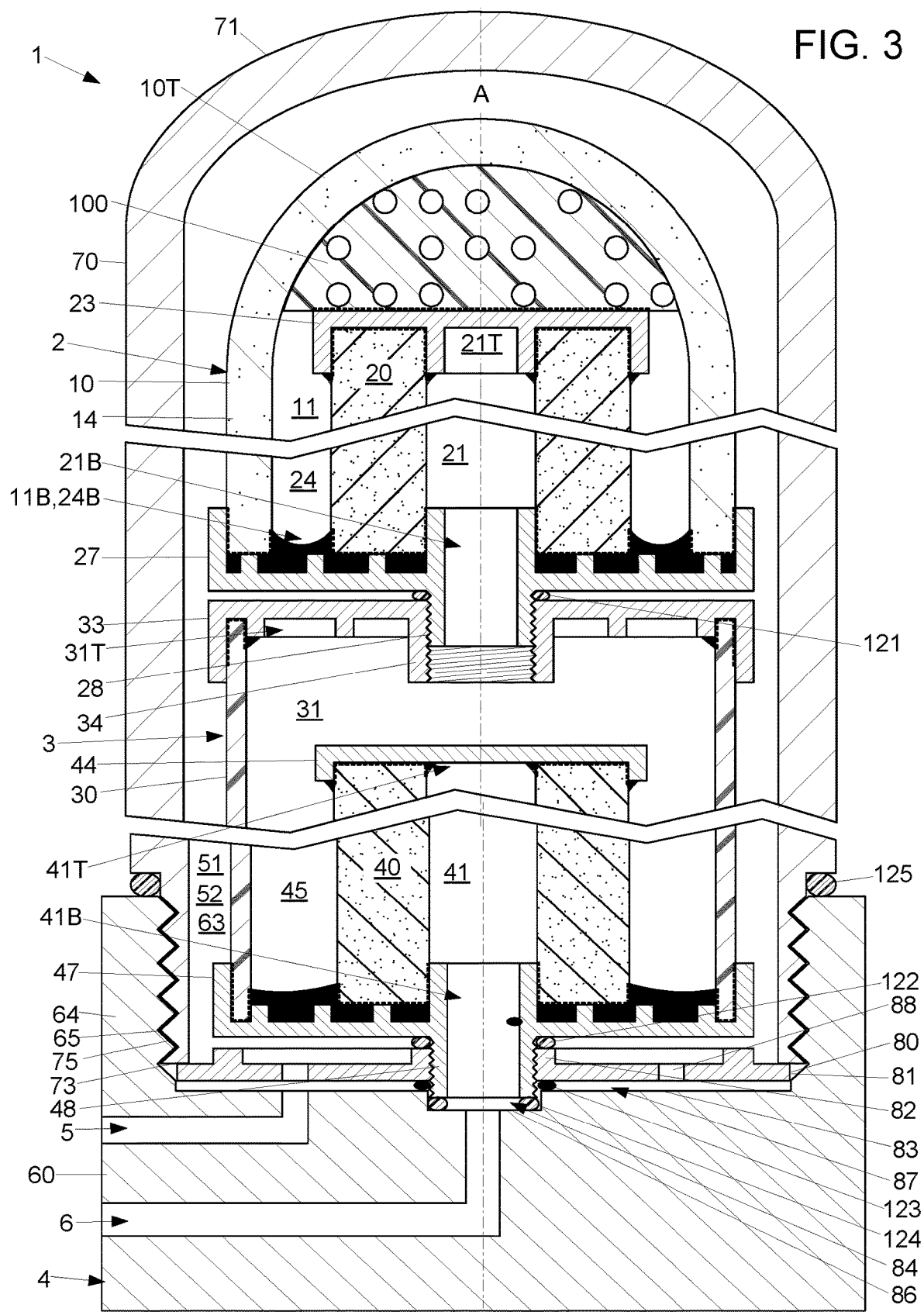
FIG. 3 is an expanded view of certain sections of apparatus.
Figure 4A:
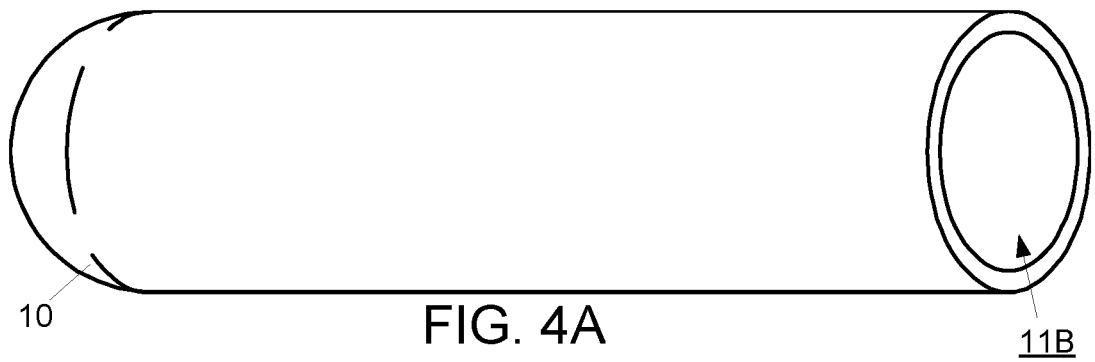
FIGS. 4A-4C are different views, taken from different viewpoints, of a first tube of the apparatus.
Figure 4B:
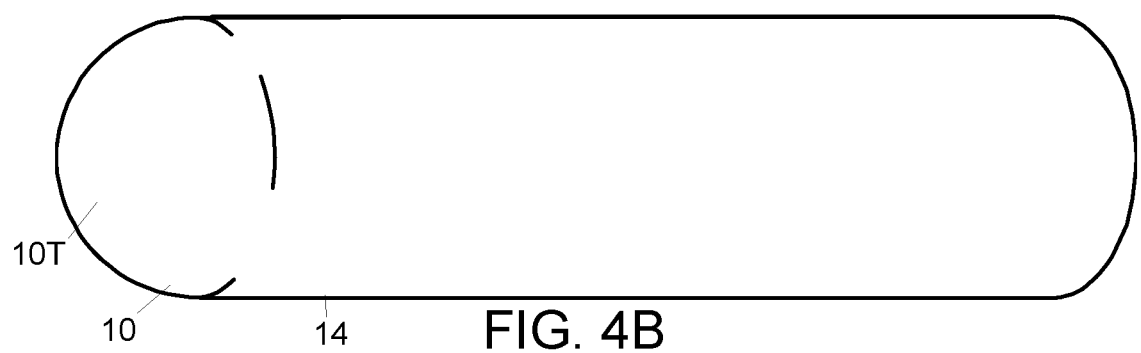
Figure 4C:
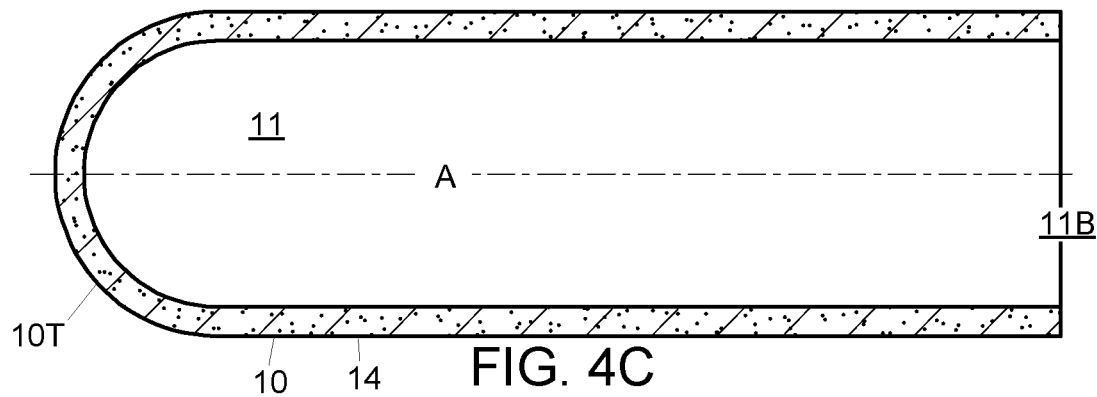

FIG. 1 is a sectional view of an example fluid filtering apparatus 1, shown in an assembled configuration. FIG. 3 is an exploded (unassembled) view of the apparatus 1. FIG. 2 is an expanded view of certain sections of apparatus 1.

The apparatus 1 includes an upper cartridge 2, and a lower cartridge 3. The cartridges 2, 3 are screwed (coupled) together and housed in a casing 4. In operation, fluid flows through an inlet 5 of the casing 4, through filtering components of the upper cartridge 2 and the lower cartridge 3, and out an outlet 6 of the casing. The fluid being filtered by the apparatus may be a liquid, for example water.

The example apparatus 1 is described below with reference to an axis A. With reference to the apparatus' orientation in FIGS. 1-3, axis A is vertical. Each component of the example apparatus 1 is centered on the axis A. In the description below: "Axially" means along axis A. "Laterally" means perpendicular to axis A. "Upper" and "lower" are with reference to the apparatus' orientation in FIG. 1. Accordingly, if the apparatus 1 would be oriented upside down, the "upper" cartridge 2 would be below the "lower" cartridge 3. And if the apparatus 1 would be oriented sideways (on its side), the "upper" and "lower" cartridges 2, 3 would be on the same level.

FIGS. 3 and 4A-4C show an axially-extending permeable rigid first tube 10 of upper cartridge 2. The first tube 10 is formed of a first fluid-filtering material. The first fluid-filtering material may be permeable porous ceramic. The first tube 10 includes a tubular section 14 and an adjoining crown 10T, both comprised of the first fluid-filtering material and formed as a one-piece unit. The first tube 10 defines a first-tube cavity 11 that extends downward from a closed top (crown 10T) to a first-tube bottom opening 11B. The crown 10T overlies and extends across the first-tube cavity 11, and the tubular section 14 surrounds and bounds the cavity 11.

Figures 5A, 5B:
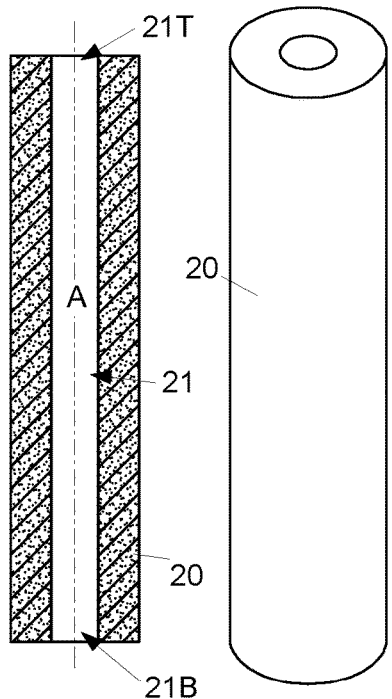
FIGS. 5A-5B are different views, taken from different viewpoints, of a second tube of the apparatus.
Figures 6A, 6C:
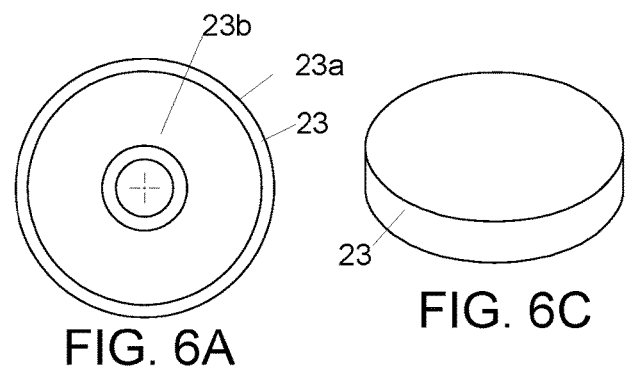
FIGS. 6A-6D are different views, taken from different viewpoints, of a top cap located on the second tube.
Figures 6B, 6D:
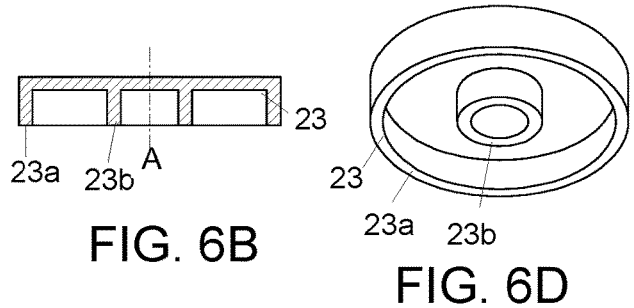

FIGS. 3 and 5A-5B show an axially-extending permeable rigid second tube 20 of the upper cartridge 2. The second tube 20 is formed of a second fluid-filtering material. This second fluid-filtering material may be permeable porous activated carbon. The second tube 20 is located within the first-tube cavity 11. The second tube 20 defines a second-tube cavity 21, extending from a second-tube bottom opening 21B to a second-tube top opening 21T.

FIGS. 3 and 6A-6D show an impermeable rigid second-tube top cap 23 that extends across, and seals off, the second-tube top opening 21T. A circumferential (circumferentially-extending) wall of the second tube 20 is captured between a radially outer wall 23a and a radially inner wall 23b of the second-tube top cap 23.

A circumferential upper intermediate space 24 is located within the first-tube cavity 11 and circumferentially surrounds the second tube 20. The upper intermediate space 24 extends axially upward from an upper intermediate bottom opening 24B.

FIGS. 3 and 7A-7D show an impermeable upper-cartridge bottom cap 27 that extends across, and seals, the annular bottom opening 24B of the upper intermediate space 24. The upper-cartridge bottom cap 27 includes a threaded upper-cartridge outlet port 28 through which fluid may exit the second-tube cavity 21.

FIGS. 3 and 8A-8C show an axially-extending impermeable third tube 30 of the lower cartridge 3. The third tube 30 may be of rigid plastic (e.g., PVC, i.e., polyvinyl chloride). The third tube defines a third-tube cavity 31 with a third-tube top opening 31T and a third-tube bottom opening 31B. The third-tube top opening 31T communicates with second-tube bottom opening 21B, in that fluid exiting the second-tube bottom opening 21B will flow through the third-tube top opening 31T.

FIGS. 3 and 9A-9D show an axially-extending impermeable rigid third-tube top cap 33 that extends across the third tube top opening 31T. The third-tube top cap 33 has an internally-threaded lower-cartridge inlet port 34 that is configured for threaded engagement with the threaded upper-cartridge outlet port 28. This enables fluid to flow from the second-tube cavity 21, through the upper-cartridge outlet port 28 and the lower-cartridge inlet port 34, into the third-tube cavity 31. A circumferentially-extending wall of the third tube 30 is captured between a radially-outer wall 33a and a radially-inner wall 33b of the third-tube top cap 33.

Figure 10A:
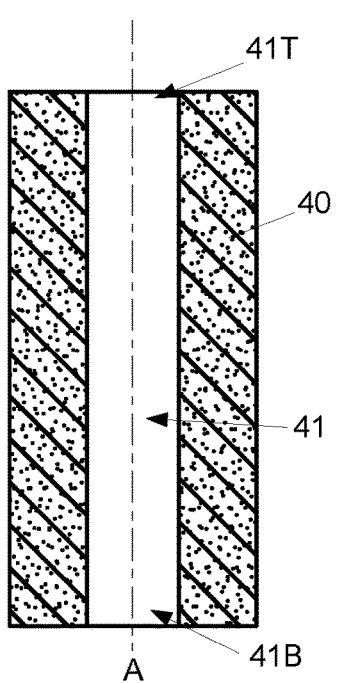
FIGS. 10A-10B are different views, taken from different viewpoints, of a fourth tube of the apparatus.
Figure 10B:
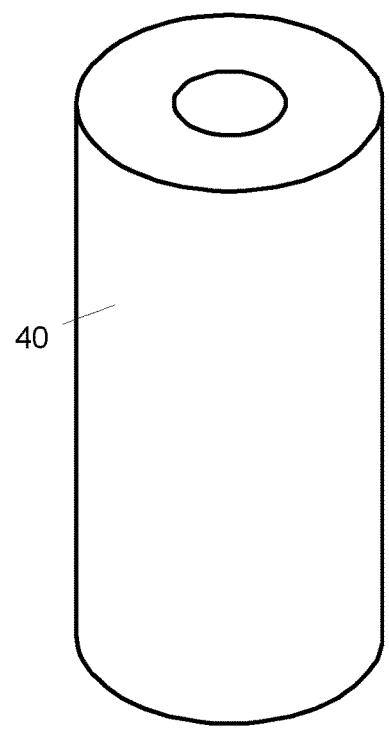

FIGS. 3 and 10A-10B show an axially-extending permeable rigid fourth tube 40 of the lower cartridge 3. The fourth tube 40 is formed of a fourth liquid-filtering material. The fourth liquid-filtering material might be of permeable porous activated carbon. The fourth tube 40 is located within the third-tube cavity 31. The fourth tube 40 defines a fourth-tube cavity 41 that extends axially from a fourth-tube top opening 41T to a fourth-tube bottom opening 41B.

Figure 11A:
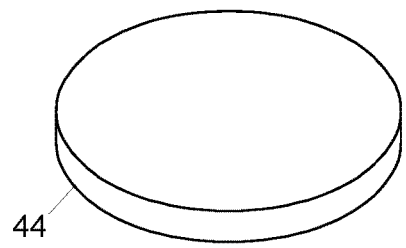
FIGS. 11A-11C are different views, taken from different viewpoints, of a top cap located on the fourth tube.
Figure 11B:
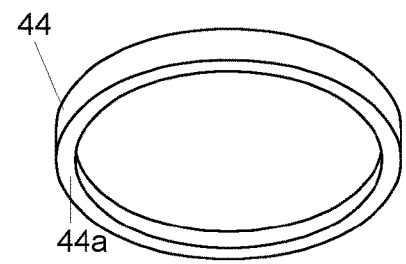
Figure 11C:
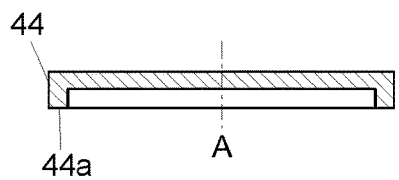

FIGS. 3 and 11A-10C show a fourth-tube top cap 44 that extends across, and seals, the fourth-tube top opening 41T. The fourth tube 40 is captured by a circumferentially-extending peripheral wall 44a of the fourth-tube top cap 44.

As shown in FIG. 3, a circumferential lower intermediate space 45 is located within the third-tube cavity 31 and circumferentially surrounds the fourth tube 40.

An impermeable lower-cartridge bottom cap 47 in this example is identical to the upper-cartridge bottom cap 27 shown in FIGS. 7A-7D. As shown in FIG. 3, the lower-cartridge bottom cap 47 extends across, and seals, an annular bottom opening of the lower intermediate space 46. The lower-cartridge bottom cap 47 includes an externally-threaded lower-cartridge outlet port 48 through which fluid may exit the fourth tube 40. All caps 23, 27, 33, 44, 47 in this example are of plastic (e.g, polyethylene).

The cartridges 2, 3 are contained in a casing cavity 51 that is enclosed by the casing 4 (housing, container). The casing 4 is formed of a rigid material (e.g., stain steel, plastic). A casing intermediate space 52 is located within the casing cavity 51 and circumferentially surrounds the cartridges 2, 3. The inlet channel 5 in the casing 4 channels fluid into the casing cavity 51 (container cavity). The outlet channel 6 in the casing 4 channels fluid out of the casing cavity 51.

FIGS. 3 and 12A-12D show a base 60 of the casing 4. The base 60 has a closed bottom and a top opening 62. A base recess 63 (cavity) extends downward from the base's top opening 62. A cylindrical sidewall 64 surrounds and bounds the casing recess 63. The base's sidewall 64 has an internal screw thread 65.

FIGS. 3 and 13A-13C show a casing tube 70 of the casing 4. The casing tube 70 has a closed top 71 (crown) and a bottom opening 72. The bottom opening 72 is surrounded by an annular bottom edge 73. An external screw thread 75 extends around an external surface of the casing tube 70. The casing tube's screw thread 75 is screwed, by the end user, into the base's screw thread 65. The casing's base 60 and tube 70 are thus screwed together, and together encase the casing cavity 51.

FIGS. 3 and 14A-14D show a positioning disk 80. The positioning disk 80 in this example is of rigid plastic (e.g., PVC, polyethylene). It helps keep the cartridges 2, 3 centered in the casing cavity 51. The positioning disk 80 has an annular periphery 81 that is pressed down by the casing tube's bottom edge 73. The lower cartridge's externally-threaded outlet port 48 is screwed into an axially-extending internally-threaded bore 82 of the positioning disk 80. The positioning disk 80 has axially-extending channels 88 (through-holes) to enable fluid below the disk 80 to flow upward through the disk 80. This example has four channels 88 spaced circumferentially 90 degrees apart from each other. Another example might have two channels spaced circumferentially 180 degrees apart from each other. Flow of the fluid (water) through the apparatus 1 might be a positive function of the number of channels 88 and the diameters of the channels 88. Accordingly, the number and diameters of the channels 88 might be used (selected by a designer of the apparatus) to help regulate the flow through the apparatus 1.

Figure 12A:
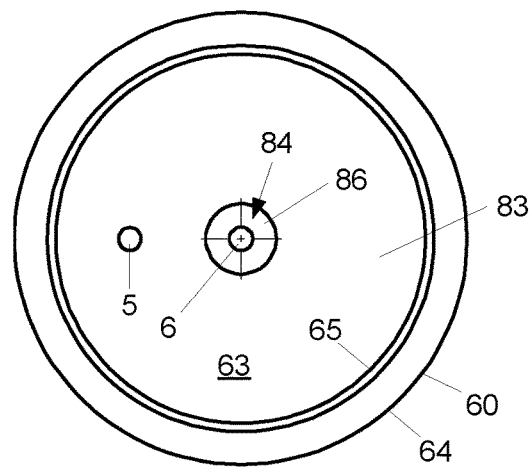
FIGS. 12A-12D are different views, taken from different viewpoints, of a base of a casing of the apparatus.
Figure 12C:
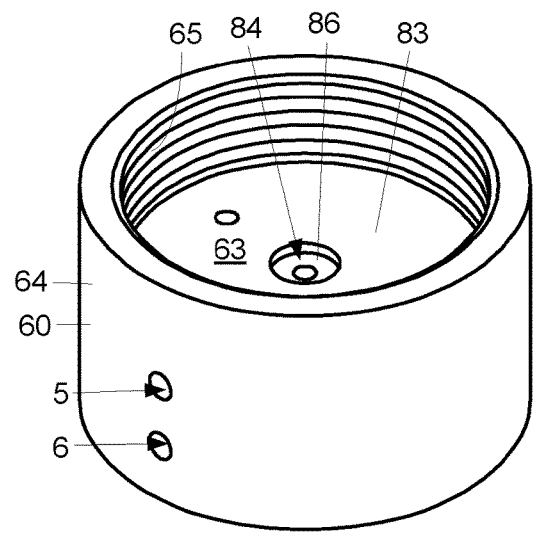
Figure 12B:
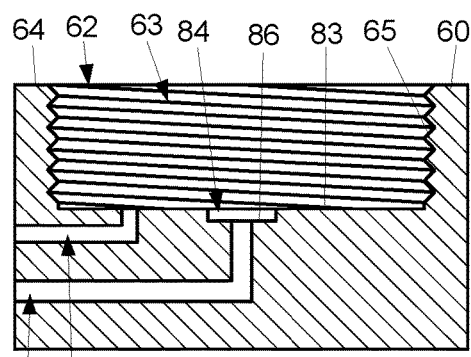
Figure 12D:
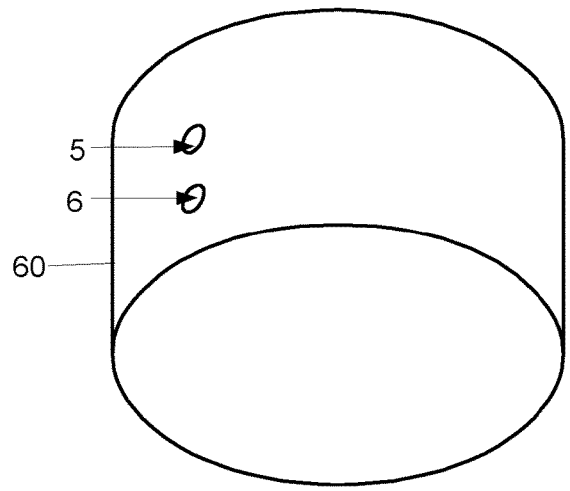
Figure 13A:
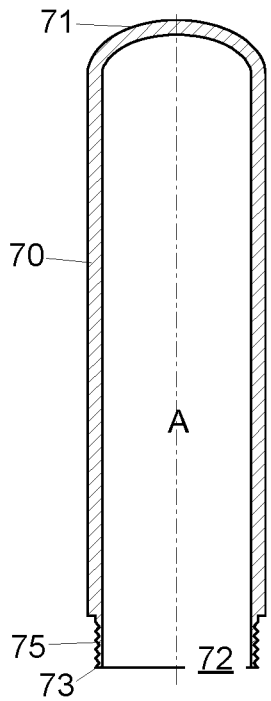
FIGS. 13A-13C are different views, taken from different viewpoints, of a tube of the casing.
Figure 13B:
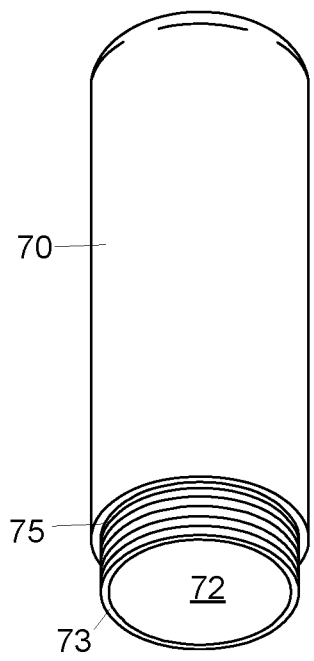
Figure 13C:
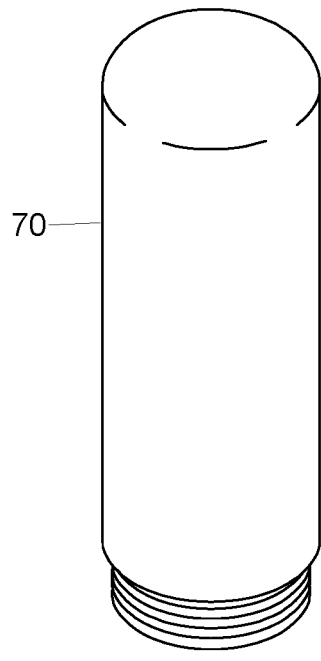
Figure 14A:
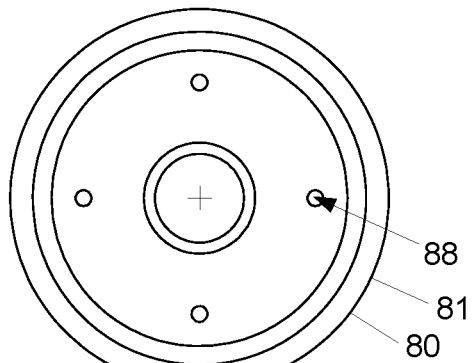
FIGS. 14A-14D are different views, taken from different viewpoints, of a positioning disk of the apparatus.
Figure 14C:
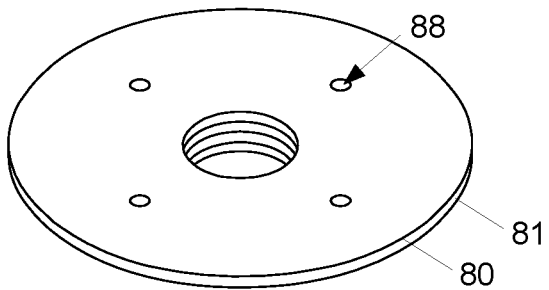
Figure 14B:
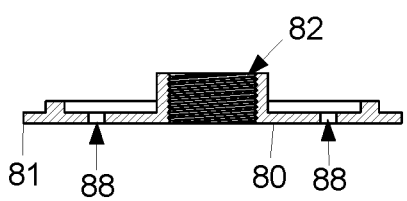
Figure 14D:
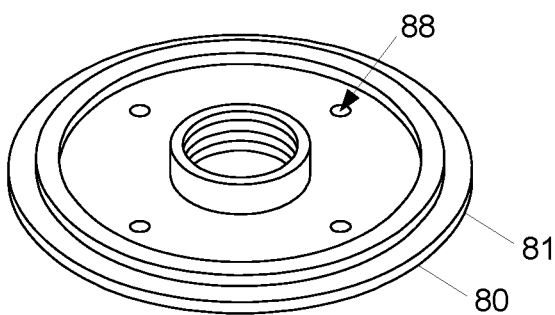

As shown in FIGS. 3 and 12D, a flat bottom surface 83 of the casing base 60 is interrupted by a cylindrical depression 84 into which the lower cartridge's outlet port 48 extends. An O-ring 124 is compressed between an annular distal end of the lower cartridge's outlet port 48 and a bottom surface 86 of the cylindrical depression 84, and is prevented from moving laterally by the depression's side surface. The casing base 60 applies, through intermediacy of the O-ring 124 and the lower cartridge's outlet port 48, upward pressure on positioning disk 80.

The positioning disk 80 is axially fixed relative to the casing 4 by abutment from above from the casing tube's bottom edge 73 and by abutment from below from the base 60. The positioning disk 80 is laterally fixed relative to the casing 4 by abutment of disk's annular periphery 81 with the base's sidewall 64.

Figure 15A:
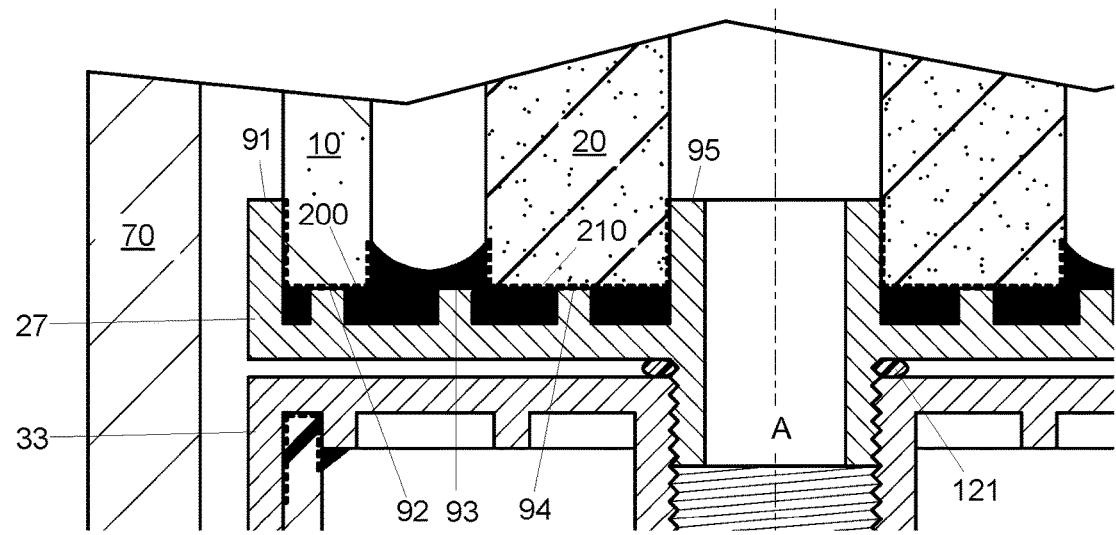
FIG. 15A is a sectional view, showing where glue is applied to the first and second tubes.
Figure 15B:
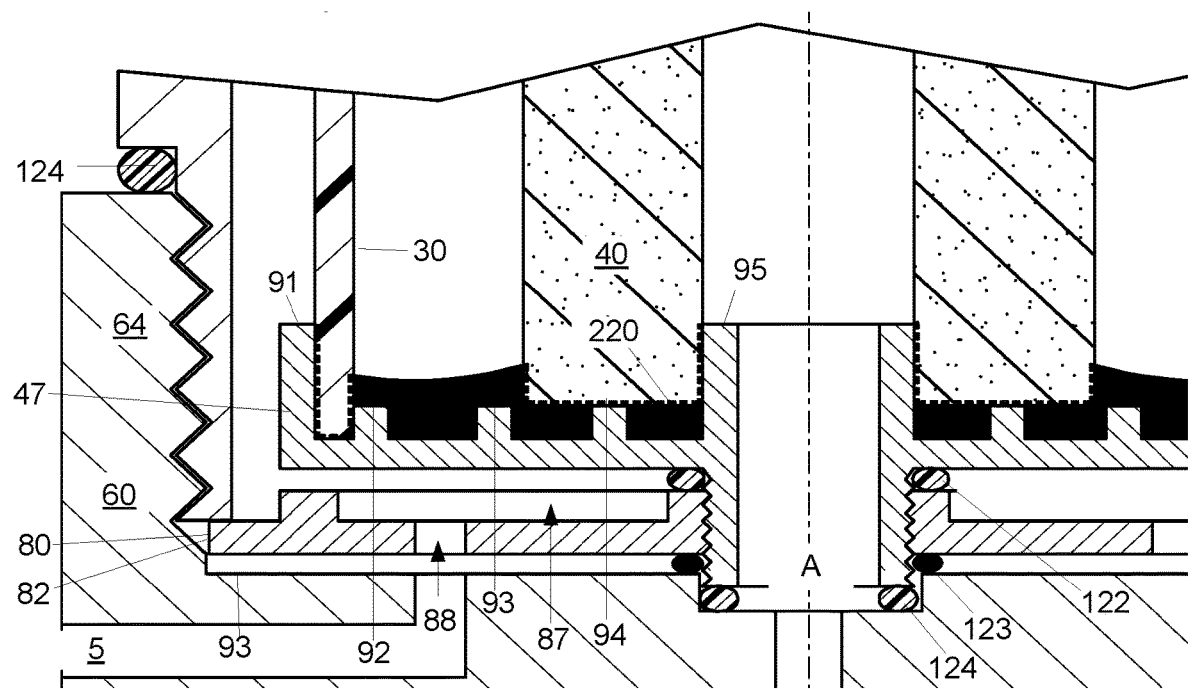
FIG. 15B is a sectional view, showing where glue is applied in the third and fourth tubes.

As shown in FIGS. 3 and 15B, the positioning disk's axial position keeps the positioning disk 80 raised above the bottom surface 83 of the base recess 63, leaving a flow space 87 between the positioning disk 80 and the casing's bottom surface 83. Fluid in the flow space 87 can flow upward through the channels 88 in the positioning disk 80.

Figure 7A:
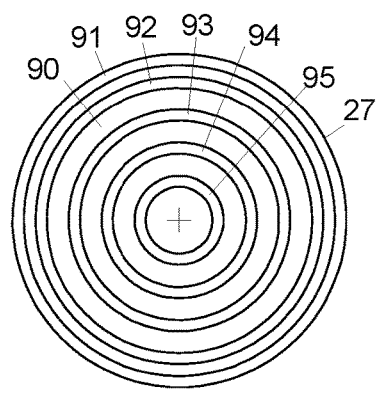
FIGS. 7A-7D are different views, taken from different viewpoints, of a bottom cap located under the first and second tubes.
Figure 7C:
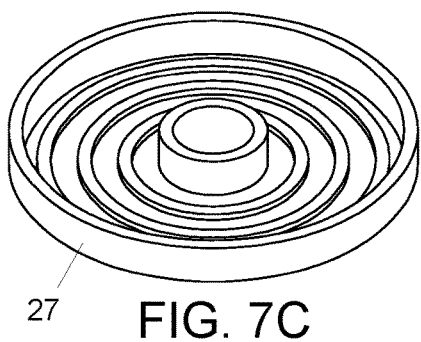
Figure 7B:
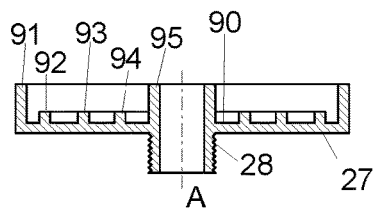
Figure 7D:
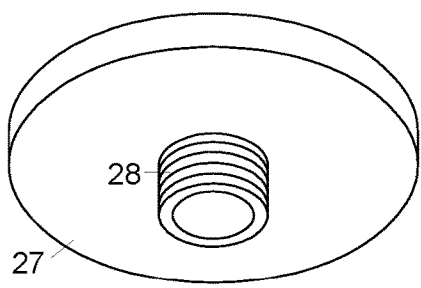
Figure 8A:
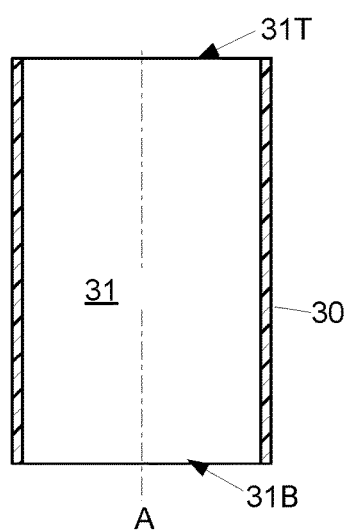
FIGS. 8A-8C are different views, taken from different viewpoints, of a third tube of the apparatus.
Figure 8B:
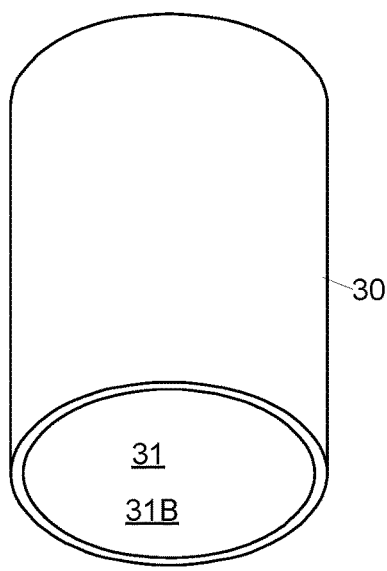
Figure 8C:
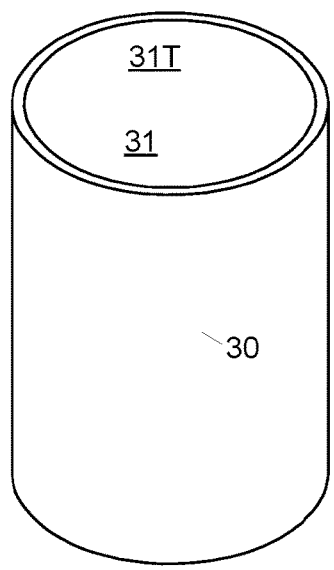
Figure 9A:
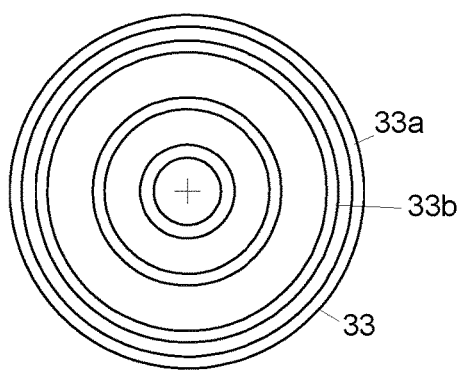
FIGS. 9A-9D are different views, taken from different viewpoints, of a top cap located on the third tube.
Figure 9C:
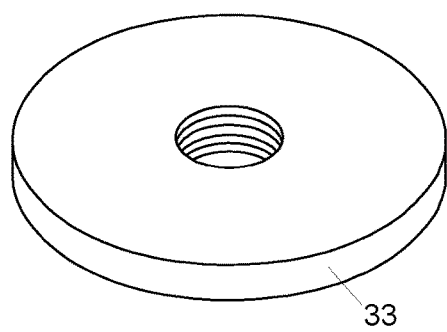
Figure 9B:
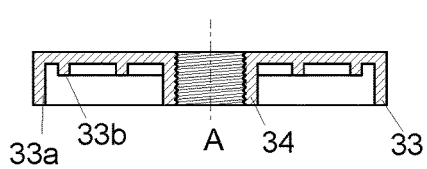
Figure 9D:
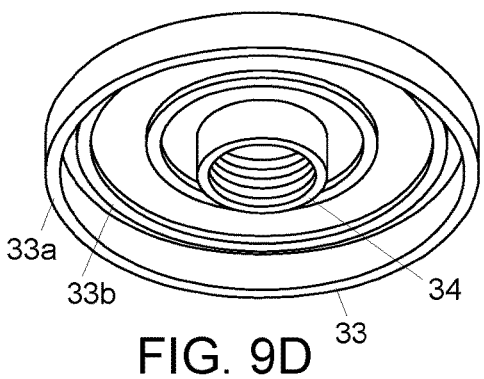

Referring to FIGS. 7D and 15A-15B, the bottom caps 27, 47 of the upper and lower cartridges 2, 3 are identical. Each bottom cap 27, 47 includes a laterally-extending top surface 90 that is interrupted by five annular bosses 91-95. The annular bosses 91-95 project upward from the top surface 90 and extend circumferentially about the axis A and are centered on the axis A. The first boss 91 is an outer wall located along the periphery of the bottom cap 27. Each of the second, third, fourth and fifth bosses 92, 93, 94, 95 is of successively smaller radius. The fifth boss 95 is an upwardly-projecting extension of the upper-cartridge outlet port 28, and surrounds and bounds an outlet channel of the lower cartridge 3. The first and fifth bosses 91, 95 are approximately the same height (about 0.4 inch tall in this example), and are taller than the second, third and fourth bosses 92, 93, 94 (which are about 0.15 inch tall in this example).

As shown in FIG. 15A, regarding the upper cartridge's bottom cap 27: The first tube 10 is received closely by the first boss 91 and rests on top of the second boss 92. The second tube 20 rests on the fourth boss 94 and closely receives (engages) the fifth boss 95.

As shown in FIG. 15B, regarding the lower cartridge's bottom cap 47: A circumferential wall of the third tube 30 is captured between (closely received by) the first and second bosses 91, 92, The fourth tube 40 rests on the fourth boss 94 and closely receives (engages) the fifth boss 95.

Figure 16:
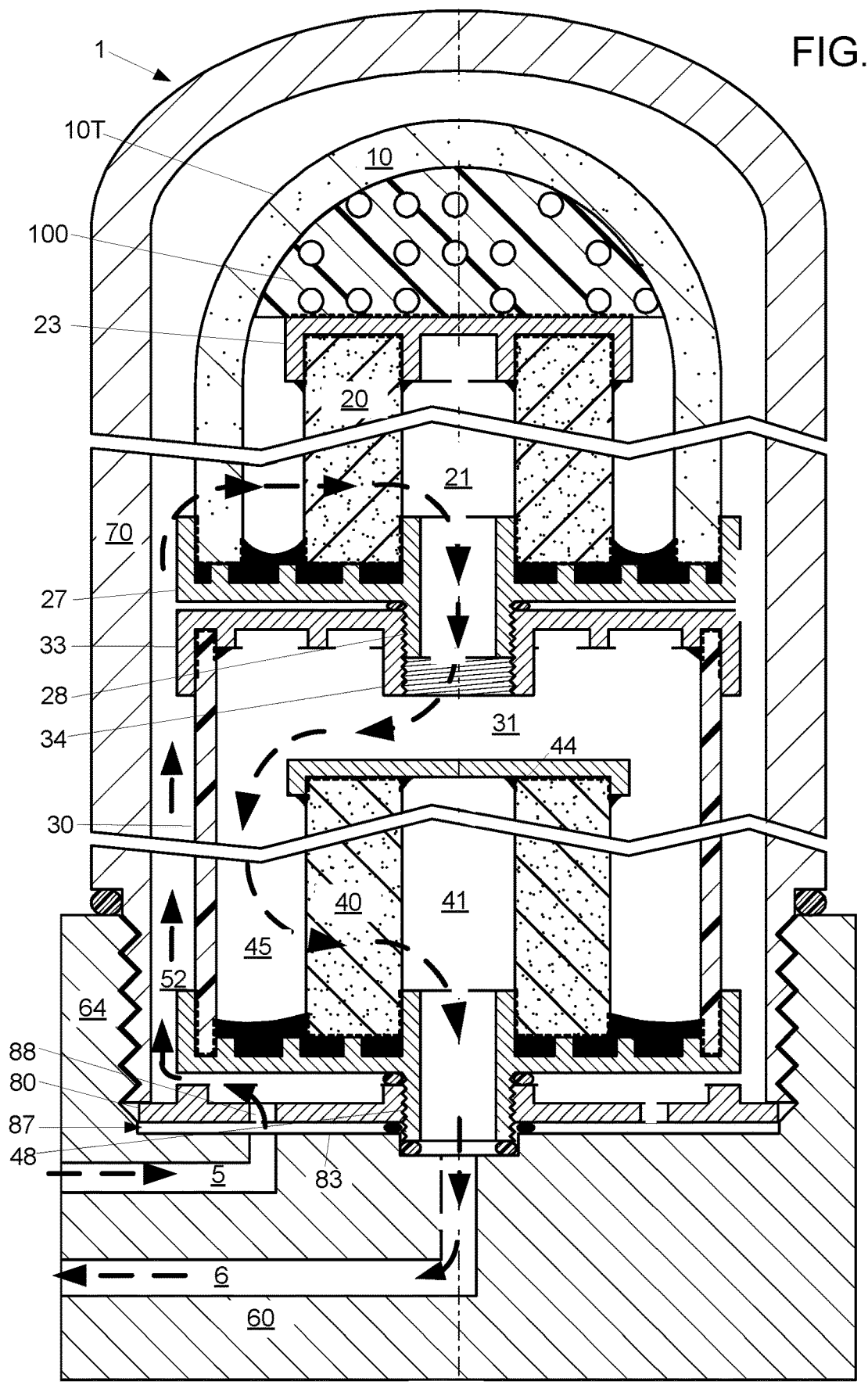
FIG. 16 is a sectional view showing a fluid flow path in the apparatus.

As shown in FIG. 16, a flexible top spacer 100 (centering piece) is adheringly connected to a top end of the second tube 20. In this example, the top spacer 100 is a piece of sponge. The adhering connection is indirect, in that the spacer 100 is adhered to a top surface of the second-tube top cap 23 which is itself adhered to the second tube 20. The spacer 100 non-adheringly abuts an inner surface of the first tube's crown 10T. In this example, the sponge 100 is hemispherical, and the non-adhering abutment extends substantially along the entire hemispherical outer surface of the spacer 100 and the entire hemispherical inner surface of the crown 15. Alternatively, the spacer 100 might be disk-shaped with an annular peripheral surface (rim) that non-adheringly abuts an inner surface of the first tube 10. When the apparatus 1 is assembled, the non-adhering abutment reduces lateral movement of the distal end of the second tube 20 relative to the first tube 10 when the upper cartridge 2 is shaken. During assembly, the non-adhering abutment additional reduces the probability of the distal end of the second tube 20 scraping the inner surface of the first tube 10 when being inserted into the first tube 10.

Certain parts are permanently adhered together—in this example with glue (e.g., hot-melt glue). In FIGS. 15A-15B and 16, examples of pools of glue (glue of significant thickness) are portrayed with black shading. Examples of glue with negligible thickness, located between adjacent walls that abut or almost abut each other are portrayed with thick dashed lines.

As shown in FIG. 15A, glue adheres both the first tube 10 and the second tube 20 to the lower cartridge's bottom cap 27. Glue extends from a bottom surface 200 of the first tube 10 to both (i) a radially-outer side surface of the second boss 92 and (ii) a radially-inner side surface of the second boss 92. Glue also extends from a bottom surface 210 of the second tube 20 to both (i) a radially-outer side surface of the fourth boss 94 and (ii) a radially-inner side surface of the fourth boss 94. This configuration, of glue adhering to both inner and outer side surfaces of bosses 92, 94, may provide adhesion that is stronger and more reliable than if the caps' top surfaces were flat and lacked the bosses.

As shown in FIG. 15B, glue adheres both the third tube 30 and the fourth tube 40 to the lower cartridge's bottom cap 47. Glue extends from a bottom surface 220 of the fourth tube to (i) a radially-outer side surface of the fourth boss 94 and (ii) a radially-inner side surface 222 of the fourth boss 94.

As shown in FIG. 3, glue adheres the flexible spacer 100 to the second-tube top cap 23, and adheres the second-tube top cap 23 to the second tube 20, and adheres the third-tube top cap 33 to the third tube 30, and adheres the fourth-tube top cap 44 to the fourth tube 40.

As shown in FIG. 3, O-rings provide a seal between components. A first O-ring 121 provides a seal between the upper cartridge 2 and the lower cartridge 3. A second O-ring 122 provides a seal between the lower cartridge 3 and the positioning disk 80. A third O-ring 123 provides a seal between the positioning disk 80 and the casing base 60. A fourth O-ring 124 provides a seal between the lower cartridge's outlet port 48 and the casing base 60. A fifth O-ring 125 provides a seal between the casing base 60 and the casing tube 70.

The apparatus 1 may be sold to an end user in four user-separable parts—the upper cartridge 2, the lower cartridge 3, the casing base 60 and the casing tube 70. The apparatus 1 may be sold and provided by a vendor to the user in the assembled configuration (shown in FIG. 1). Alternatively, the apparatus 1 may be provided to the user in an unassembled configuration of the four user-separable parts. To assemble the apparatus 1, the user can screw the upper cartridge 2 into the lower cartridge 3, then screw the lower cartridge 3 into the positioning desk 80, then position the cartridges 2, 3 over the casing base 60 such that the lower cartridge's outlet port 3 is inserted into the casing base's recess 84, then move the casing tube 70 down over the cartridges 2,3, and screw the casing tube 70 into the casing base 60.

FIG. 16 shows a fluid flow path through the apparatus 1. All fluid entering the casing cavity 51 through the casing inlet channel 5 may be constrained by the apparatus 1 to (i) flow into the flow space 87 between the positioning disk 80 and the casing's bottom surface 83, (ii) upward through the holes 88 in the disk, (iii) upward through the casing intermediate space 52, (iv) radially-inward through the first tube 10 and through the second tube 20 into the second-tube cavity 21, (v) downward through the upper-cartridge outlet port 28 and the lower-cartridge inlet port 34, (vi) into the third-tube cavity 31 and the lower intermediate space 45, (vii) radially inward through the fourth tube 40 into the fourth-tube cavity 41, (viii) downward through the lower-cartridge outlet port 48 and (iv) through the casing outlet channel 6 to exit the casing 4.

A manufacturer may manufacture a variety of upper cartridges 2 that are interchangeable with each other and differ from each other in terms of length and filtering materials used for the first and second filtering tubes 10, 20. The manufacturer may also manufacture a variety of lower cartridges 3 that are interchangeable with each other in terms of length and filtering materials used for the fourth filtering tube 40. Some of the available upper cartridges may be shorter than some of the available lower cartridges, and longer than others. The choice of which upper cartridge and which lower cartridge to use may depend on which cartridge length (tube length) and which filtering materials are best suited for filtering out the particular contaminants and contaminant concentrations found in the end user's water. Although the above example uses just one lower cartridge 3, different lower cartridges may be screwed together end-to-end in series, between the upper cartridge 2 and the positioning disk 80, as long as the overall length of the cartridges is short enough for the cartridges to fit in the casing 4.

Although the fluid being filtered in this example is water, the fluid may alternatively be a gas or a liquid other than water.

The components and procedures described above provide examples of elements recited in the claims. They provide examples of how a person of ordinary skill in the art can make and use the claimed invention. They are described here to provide enablement without imposing limitations that are not recited in the claims. In some instances in the above description, a term is followed by an alternative term, or a substantially equivalent term, enclosed in parentheses.

The invention claimed is:

1. A fluid-filtering apparatus, comprising:
   an upper cartridge including:
      a first tube of a first fluid-filtering material, that surrounds and extends along an axis and that defines a first-tube cavity extending from a closed top to a first-tube bottom opening;
      an axially extending second tube of a second fluid-filtering material, that is located within the first-tube cavity and that defines a second-tube cavity extending from a closed top to a second-tube bottom opening; and
      an upper-cartridge bottom cap that extends across, and seals, the first-tube bottom opening;
   a lower cartridge including:
      an axially-extending third tube, that defines a third-tube cavity with a third-tube top opening that communicates with the second-tube bottom opening;
      an axially-extending fourth tube comprising a fourth fluid-filtering material, that is located within the third-tube cavity and that defines a fourth-tube cavity that extends from a closed top end to a fourth-tube bottom opening; and
      a lower-cartridge bottom cap that extends across, and seals, the second-tube bottom opening; and
   a casing including:
      an inlet channel configured to channel fluid into the fluid-filtering apparatus; and
      an outlet channel configured for fluid communication with the fourth-tube bottom opening,
   wherein fluid flowing through the fluid-filtering apparatus is configured to flow in an order of (i) into the casing through the inlet channel, (ii) through and into the first tube, (iii) through and into the second tube, (iv) downward through the second-tube bottom opening and into the third-tube top opening, (v) through and into the fourth tube, (vi) through the fourth-tube bottom opening, and (vii) out through the casing's outlet channel.

2. The apparatus of claim 1, wherein the upper-cartridge bottom cap includes a threaded upper-cartridge outlet port through which fluid may exit the second-tube cavity.

3. The apparatus of claim 2, wherein the lower cartridge includes a third-tube top cap that (i) extends across the third-tube top opening and that (ii) has a threaded lower-cartridge inlet port that is configured for threaded engagement with the threaded upper-cartridge outlet port.

4. The apparatus of claim 1, wherein the second tube includes an impermeable top cap that overlies and extends across the second-tube cavity.

5. The apparatus of claim 1, further comprising a flexible top spacer, adheringly connected to a top end of the second tube, and configured to non-adheringly abut an inner surface of the first tube.

6. The apparatus of claim 5, wherein the adhering connection is through the top spacer being glued to a cap that is glued to a top of the second tube.

7. The apparatus of claim 1, wherein the lower-cartridge bottom cap includes a threaded lower-cartridge outlet port that allows fluid to exit the fourth-tube cavity.

8. The apparatus of claim 1, wherein the casing includes
   a casing base that has (i) a top opening, (ii) a casing cavity extending downward from the base's top opening, and (iii) an internal screw thread surrounding the base's cavity; and
   a casing tube that has (i) a closed top end, (ii) a bottom opening, (ii) an annular bottom edge surrounding the casing tube's bottom opening, (iii) a casing cavity, extending upward from the bottom opening, and (iv) an external screw thread that is external to casing cavity and surrounds the casing cavity and is configured to be screwed into the base's screw thread, for the casing base and the casing tube to be screwed together and together bound the casing cavity.

9. The apparatus of claim 8, wherein the apparatus further comprises a positioning disk having (i) a periphery configured to be pressed down by the casing tube's bottom edge, and (ii) an axially-extending threaded bore, and wherein the lower-cartridge bottom cap includes a threaded lower-cartridge outlet port configured to be screwed into the positioning disk's threaded bore.

10. The apparatus of claim 9, wherein the casing base is configured to apply upward pressure on the lower-cartridge outlet port to keep the positioning disk raised above a bottom surface of the base cavity.

11. The apparatus of claim 9, wherein the positioning disk includes axially-extending channels that enable fluid exiting the casing inlet to flow upward through the positioning disk.

12. The apparatus of claim 9, wherein the casing base's bottom surface includes a cylindrical depression into which the lower-cartridge outlet port extends, and wherein a bottom surface of the depression applies upward pressure on the lower-cartridge outlet port.

13. The apparatus of claim 9, wherein the positioning disk is axially fixed relative to the casing (i) by abutment from above from the casing tube's bottom edge against the positioning disk and (ii) by abutment from below from the base against the lower-cartridge outlet port.

14. The apparatus of claim 1, wherein the upper-cartridge bottom cap includes a laterally-extending top surface that is interrupted by annular first, second, third and fourth bosses that project upward from the top surface and extend circumferentially about axis, and wherein the first tube is received closely by the first boss and rests on the second boss, and the second tube rests on the third boss and closely receives the fourth boss.

15. The apparatus of claim 14, wherein:
   glue extends from a bottom surface of the first tube to a radially-outer side surface of the second boss;
   glue extends from the bottom surface of the first tube to the radially-inner side surface of the second boss;
   glue extends from a bottom surface of the second tube to a radially-outer side surface of the third boss; and
   glue extends from the bottom surface of the second tube to a radially-inner side surface of the third boss.

16. The apparatus of claim 1, wherein the lower-cartridge bottom cap includes a laterally-extending top surface that is interrupted by annular first, second, third and fourth bosses that project upward from the top surface and extend circumferentially about axis, wherein the third tube comprises a tubular wall that is captured closely between the first and second bosses, and the fourth tube rests on the third boss and closely receives the fourth boss.

17. The apparatus of claim 1, wherein the first fluid-filtering material comprises ceramic, and both the second fluid-filtering material and the third fluid-filtering material comprise carbon.

18. The apparatus of claim 1, wherein the first, second, third and fourth tubes have a cylindrical periphery centered on the axis, and the bottom caps have a cylindrical periphery.

19. The apparatus of claim 1, wherein the lower cartridge includes a single fourth tube within the third-tube cavity.

20. A method, comprising filtering water using the apparatus of claim 1.

* * * * *